US005547109A

United States Patent [19]

Robbins, III

[11] Patent Number: 5,547,109
[45] Date of Patent: Aug. 20, 1996

[54] CONTAINER AND MEASURING/DISPENSING CAP ASSEMBLY

[76] Inventor: Edward S. Robbins, III, 2802 E. Avalon Ave., Muscle Shoals, Ala. 35661

[21] Appl. No.: 291,919

[22] Filed: Aug. 18, 1994

Related U.S. Application Data

[63] Continuation-in-part of Ser. No. 26,369, Jul. 26, 1994, Pat. No. Des. 363,649, and a continuation-in-part of Ser. No. 288,896, Aug. 10, 1994, Pat. No. 5,509,582, which is a continuation of Ser. No. 47,086, Apr. 16, 1993, abandoned, which is a continuation-in-part of Ser. No. 237,336, May 3, 1994, Pat. No. 5,465,871, which is a continuation of Ser. No. 979,042, Nov. 19, 1992, abandoned.

[51] Int. Cl.⁶ ............................................. B67D 5/38
[52] U.S. Cl. ...................... 222/158; 220/254; 220/521; 228/456; 228/556
[58] Field of Search .......................... 222/142.4, 142.5, 222/154, 156, 157, 158, 424.5, 425, 454, 456, 556, 564; 220/254, 521, 522

[56] References Cited

U.S. PATENT DOCUMENTS

| | | | |
|---|---|---|---|
| 1,273,012 | 7/1918 | Souther | 222/456 |
| 1,714,368 | 5/1929 | Hobson . | |
| 1,802,284 | 4/1931 | Stoddard | 222/572 X |
| 2,214,437 | 9/1940 | Punte et al. | 206/42 |
| 2,370,820 | 3/1945 | Stott | 222/456 |
| 2,449,285 | 9/1948 | Ekstrom | 220/253 X |
| 2,784,884 | 3/1957 | Borie, Jr. | 222/336 |
| 2,804,103 | 8/1957 | Wall | 141/381 |
| 2,811,281 | 10/1957 | Donovan | 222/154 X |
| 2,840,124 | 6/1958 | Greene | 222/212 |
| 2,844,266 | 7/1958 | Hofe | 215/244 |
| 3,020,659 | 2/1962 | Paulini | 210/307 |
| 3,033,420 | 5/1962 | Thomas et al. | 222/1 |
| 3,140,799 | 7/1964 | Mehr | 222/519 |
| 3,424,355 | 1/1969 | Blumen | 222/450 |
| 3,486,665 | 12/1969 | La Croce | 220/254 X |
| 3,578,467 | 5/1971 | Huber | 99/182 |
| 3,860,111 | 1/1975 | Thompson | 206/534 |
| 3,948,105 | 4/1976 | Johnson, Jr. | 73/427 |
| 3,985,274 | 10/1976 | Lubalin et al. | 222/362 |
| 4,069,935 | 1/1978 | Hampel | 220/377 X |
| 4,079,860 | 3/1978 | Maves | 222/48 |
| 4,083,467 | 4/1978 | Mullins et al. | 222/456 X |
| 4,130,149 | 12/1978 | Hausam | 222/512 X |
| 4,144,989 | 3/1979 | Joy | 222/438 |
| 4,164,301 | 8/1979 | Thayer | 220/253 |
| 4,279,364 | 7/1981 | Perez | 222/162 |
| 4,292,846 | 10/1981 | Barnett | 73/427 |
| 4,346,823 | 8/1982 | Eppenbach | 222/443 |
| 4,376,497 | 3/1983 | Mumford | 222/153 |
| 4,399,928 | 8/1983 | Klingler | 215/237 X |
| 4,403,715 | 9/1983 | Ludovissie | 222/361 |
| 4,413,464 | 11/1983 | Larsson et al. | 53/412 |
| 4,544,063 | 10/1985 | Neward | 205/540 |
| 4,580,687 | 4/1986 | Lewis | 215/237 |
| 4,606,481 | 8/1986 | Conti et al. | 222/562 |
| 4,610,371 | 9/1986 | Karkiewicz | 215/237 X |

(List continued on next page.)

FOREIGN PATENT DOCUMENTS

9316358  8/1993  WIPO .................................. 222/456

Primary Examiner—Joseph A. Kaufman
Attorney, Agent, or Firm—Nixon & Vanderhye P.C.

[57] ABSTRACT

A container and measuring/dispensing cap assembly includes a container having a peripheral wall including four side wall portions, a bottom wall and an open upper end. A cap includes a top portion having a dispensing aperture defined by an upper rim and a pivotally mounted dispensing door engageable with the rim and a peripheral skirt portion tapering downwardly and outwardly from the top portion to a lower attachment rim adapted to secure the cap to the container. The dispensing aperture and the dispensing door are located asymmetrically relative to the open upper end of the container, and a weir panel is located below the top portion of the cap, partially defining a measuring chamber in the cap. The weir panel includes a weir edge which, in combination with the upper rim, defines a weir aperture located wholly on one side of a center axis of the cap extending parallel to the weir edge, and the dispensing door is hinged to the skirt portion adjacent the weir aperture.

15 Claims, 7 Drawing Sheets

U.S. PATENT DOCUMENTS

| | | | |
|---|---|---|---|
| 4,613,057 | 9/1986 | Sacchetti et al. | 221/265 |
| 4,635,828 | 1/1987 | Kaufman | 222/185 |
| 4,643,881 | 2/1987 | Alexander et al. | 220/253 X |
| 4,646,948 | 3/1987 | Jennings | 222/454 |
| 4,691,821 | 9/1987 | Hofmann | 206/216 |
| 4,693,399 | 9/1987 | Hickman et al. | 222/480 |
| 4,714,181 | 12/1987 | Kozlowski et al. | 215/237 |
| 4,802,597 | 2/1989 | Dubach | 215/307 |
| 4,898,292 | 2/1990 | VerWeyst et al. | 220/254 X |
| 4,930,688 | 6/1990 | Arona-Delonghi | 222/484 |
| 4,936,494 | 6/1990 | Weidman | 220/254 X |
| 4,955,513 | 9/1990 | Bennett | 222/480 |
| 4,961,521 | 10/1990 | Eckman | 222/142.5 |
| 4,966,780 | 10/1990 | Hargraves et al. | 426/118 |
| 5,011,048 | 4/1991 | Mark | 222/455 |
| 5,064,106 | 11/1991 | Butler et al. | 222/456 |
| 5,085,331 | 2/1992 | Groya et al. | 215/245 |
| 5,085,339 | 2/1992 | Roth et al. | 220/269 |
| 5,139,181 | 8/1992 | VerWeyst | 215/237 X |
| 5,219,103 | 6/1993 | Carper | 222/240 |
| 5,292,039 | 3/1994 | Neofiton | 222/158 X |

CONTAINER AND MEASURING/DISPENSING CAP ASSEMBLY

This application is a continuation-in-part of design application Ser. No. 29/026,369 filed Jul. 26, 1994 now U.S. Pat. o. Des. 363,649 and Ser. No. 08/288,896 filed Aug. 10, 1994, now U.S. Pat. No. 5,509,582 which is a continuation of Ser. No. 08/047,086 filed Apr. 16, 1993, now abandoned, which is a continuation-in-part of Ser. No. 08/237,336 filed May 3, 1994, now U.S. Pat. No. 5,465,871 which is a continuation of Ser. No. 07/979,042 filed Nov. 19, 1992, now abandoned.

TECHNICAL FIELD

The present invention relates generally to dispensing containers and, more specifically, to dispensing containers having removable caps for dispensing specific but varied amounts of the container contents.

BACKGROUND

Dispensing containers are, of course, well known and are used in many different industries for many different purposes. One such use is in the food industry, and a specific example includes molded plastic containers and other similar containers which contain solid foods (such as coffee) in particulate, granular or powder-like form. Typically, a measuring spoon or separate measuring cup is utilized in conjunction with the container when specific amounts are to be removed from the container.

DISCLOSURE OF THE INVENTION

The present invention eliminates the need for measuring spoons or cups by providing a molded, hollow plastic cap, which serves as its own measuring device, for use with a container which, in the exemplary embodiment, is sized to meet a particular application. While the incorporation of a measuring function into a container/cap construction for the discharge of desired amounts of the container contents is not new (see for example, U.S. Pat. Nos. 3,985,274, 4,144,989, 4,403,715, 4,408,703, 4,989,759 and 5,186,366) the present invention provides an improved and simplified structure for accomplishing this result.

In the exemplary embodiment of the invention, a molded transparent plastic cap is provided for use particularly with a container adapted to hold a one pound "brick" of coffee. Typically, the coffee is wrapped in foil and may be stored in a free standing manner with the foil rolled tight to a closed position (typical of bag-like foil containers). Alternatively, the foil bag may be stored in another (usually relatively rigid) container with a removable top or cap. The latter has no particular dispensing feature and, therefore, the conventional measuring spoon is required to remove measured amounts of coffee from the foil bag. In the exemplary embodiment of this invention, however, a rectangular and preferably transparent container (sized to snugly accommodate the one pound foil wrapped coffee "brick") with a unique dispensing cap is provided. The cap includes a round top portion formed by a round dispensing aperture defined by a circular (upper) rim, an associated "door" for opening and closing the dispensing aperture, and a depending skirt portion which adapts the cap for use with the rectangular container. The top portion of the cap is offset to one end of the cap, and the sides of the skirt portion are sloped downwardly to a rectangular attachment (lower) rim which permits the cap to be removably attached to the rectangular container. Because of the offset and raised location of the round top portion, and the rectangular shape of the lower cap rim, the sides of the depending skirt portion are slanted at different angles as the round top transitions to the rectangular attachment rim.

Within the area defined by the round top, and located below the upper rim surrounding the dispensing aperture, an internal partition or weir panel is provided. The weir panel is generally or partially spherical in shape and encloses an area inclusive of about 230° of the round dispensing aperture. A chord shaped weir opening (when viewed in plan) remains to one side of the panel as defined by a "weir edge" of the panel and the remaining approximately 130° of the dispensing aperture rim. Thus, the weir panel and the dispensing aperture rim combine with the dispensing "door" to form a measuring chamber into which a desired amount of container contents may be to be poured via the weir aperture. The single dispensing door is hinged to that side of the skirt portion which is remote from the weir panel, i.e., adjacent the weir aperture. In other words, after the desired amount of container contents is transferred to the measuring chamber via the weir aperture, the dispensing door hinge arrangement is such that the material will slide out of the dispensing aperture at a location diametrically opposed to the hinge, and remote from the weir edge so that no additional contents are transferred to the measuring chamber as the measured contents are dispensed from the cap. The dispensing door is provided with gradations in the form of level lines and suitable alpha and/or numeric characters, and permits the user to accurately determine specific and varied amounts transferred to the chamber.

In one aspect, therefore, the invention relates to a measuring/dispensing cap assembly comprising a container having a peripheral wall including four side wall portions, a bottom wall and an open upper end; a cap including a top portion having a dispensing aperture defined by an upper rim and a pivotally mounted dispensing door engageable with the rim and a peripheral skirt portion tapering downwardly and outwardly from the top portion to a lower attachment rim adapted to secure the cap to the container, the dispensing aperture and the dispensing door located asymmetrically relative to the open upper end of the container; a weir panel located below the top portion of the cap and partially defining a measuring chamber in the cap, and wherein the weir panel includes a weir edge which, in combination with the upper rim, defines a weir aperture located wholly on one side of a center axis of the cap extending parallel to the weir edge; and further wherein the dispensing door is hinged to the skirt portion adjacent the weir aperture.

Other objects and advantages of the invention will become apparent from the detailed description which follows.

BEST MODE FOR CARRYING OUT THE INVENTION

With reference now to FIGS. 1 through 6, a molded plastic container and associated cap is shown generally at 10, and includes a container 12 having a peripheral side wall 14 extending upwardly from a bottom wall 13, terminating in an upper open end. In the exemplary embodiment, the container 12 is sized and shaped to snugly receive a one pound, rectangular vacuum-packed foil pouch (or "brick") of ground coffee. The upper open end of the container is adapted to receive a closure or cap 16 in accordance with this invention, and as described in greater detail below.

The rectangular container 12, as well as the cap or closure 16 are preferably but not necessarily entirely constructed of transparent plastic material. By utilizing a transparent container, the foil pouch including a label and other printed information is easily visible (the closure portion of the foil pouch would normally be removed in order to take advantage of the features of this invention). The utilization of a transparent cap or closure allows the user to view the container contents transferred to the measuring chamber (described below) within the cap. It will be appreciated, however, that the cap may be opaque and the dispensing door transparent if so desired.

It should be understood that the container and dispensing cap construction 10 in accordance with this invention are equally suitable for use with other powder and/or granulated materials, such as dietary powders, spices, drink concentrates, medicinal powders, detergents and the like. With the incorporation of suitable seals, the dispensing cap of this invention may also be used to dispense liquid contents in similarly measured amounts.

The measuring/dispensing cap 16 as shown in FIGS. 1 through 5 includes a round top portion 18 formed by a round dispensing aperture 20 and a round dispensing door or lid 22. The dispensing aperture 20 is defined by a circular upstanding rim 24, also referred to herein as an upper rim. A skirt portion extends downwardly from the upper rim 24 and includes four integral sloped skin walls 26, 28, 30 and 32 (see especially FIG. 4). A lower rim 34 of the skin portion is substantially rectangular in shape and is located at the lower ends of the four skin walls 26, 28, 30 and 32. The "front" wall 26 of the skin portion extends downwardly and outwardly at a slight angle from the upper circular rim 24 to the lower rectangular rim 34. The "side" walls 28 and 32 are symmetrical to one another and extend downwardly and outwardly from the upper circular rim 24 to the lower rectangular rim 34 in opposite directions and at a greater angle than the "front" wall 26. The "rear" wall 30 of the skirt portion also extends downwardly and outwardly from the upper circular rim 24 to the lower rectangular rim 34 of the skin portion but at an even greater angle than the other skirt walls 26, 28 and 30. The degree of slope of each skirt wall is determined by the effective height of the cap and the eccentric location of the top relative to a vertical center axis through the container 12 and cap 16. These skin walls 26, 28, 30 and 32 thus provide a transition from the round dispensing aperture 20 and circular upper rim 24 to the rectangular lower rim 34 required to permit attachment of the cap 18 to the container 12. It will be appreciated that references herein to "front", "rear" or "side" skirt walls, etc. are for convenience only and are not intended to be limiting.

Figure 1:
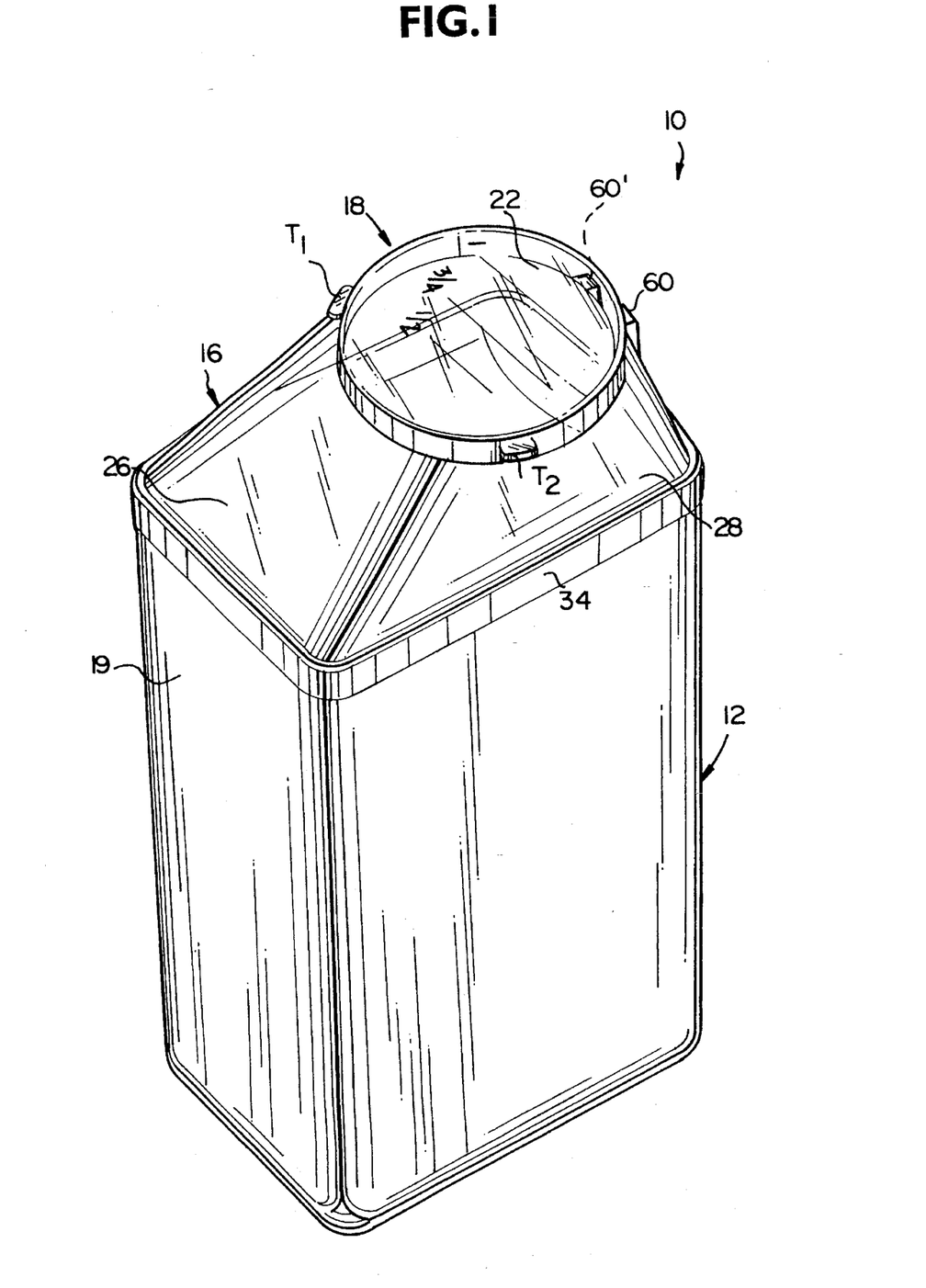
FIG. 1 is a perspective view of a dispensing cap and associated container in accordance with an exemplary embodiment of the invention.
Figure 2:
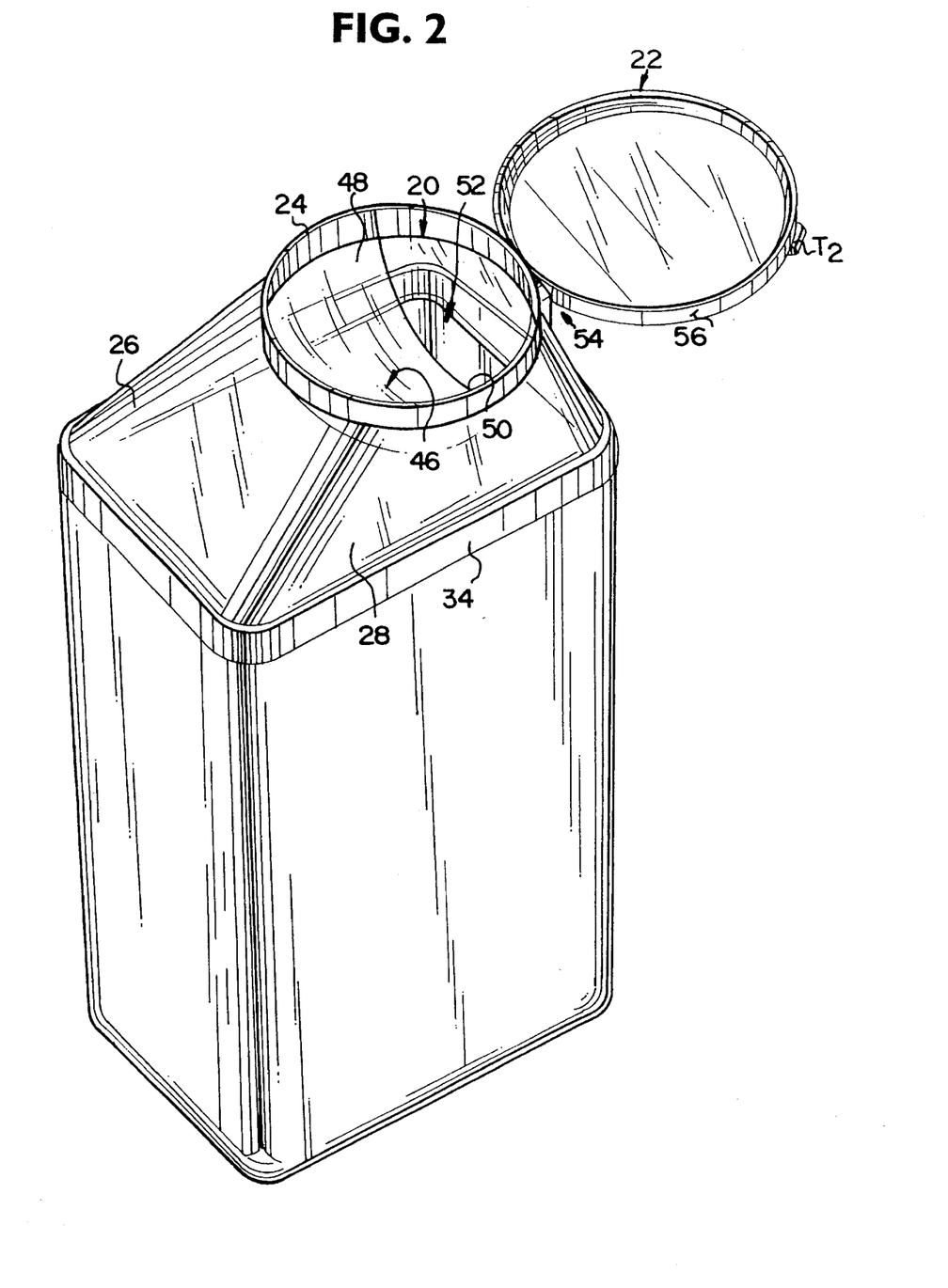
FIG. 2 is a perspective view of the dispensing cap and associated container illustrated in FIG. 1, but with the dispensing door shown in an open position.
Figure 3:
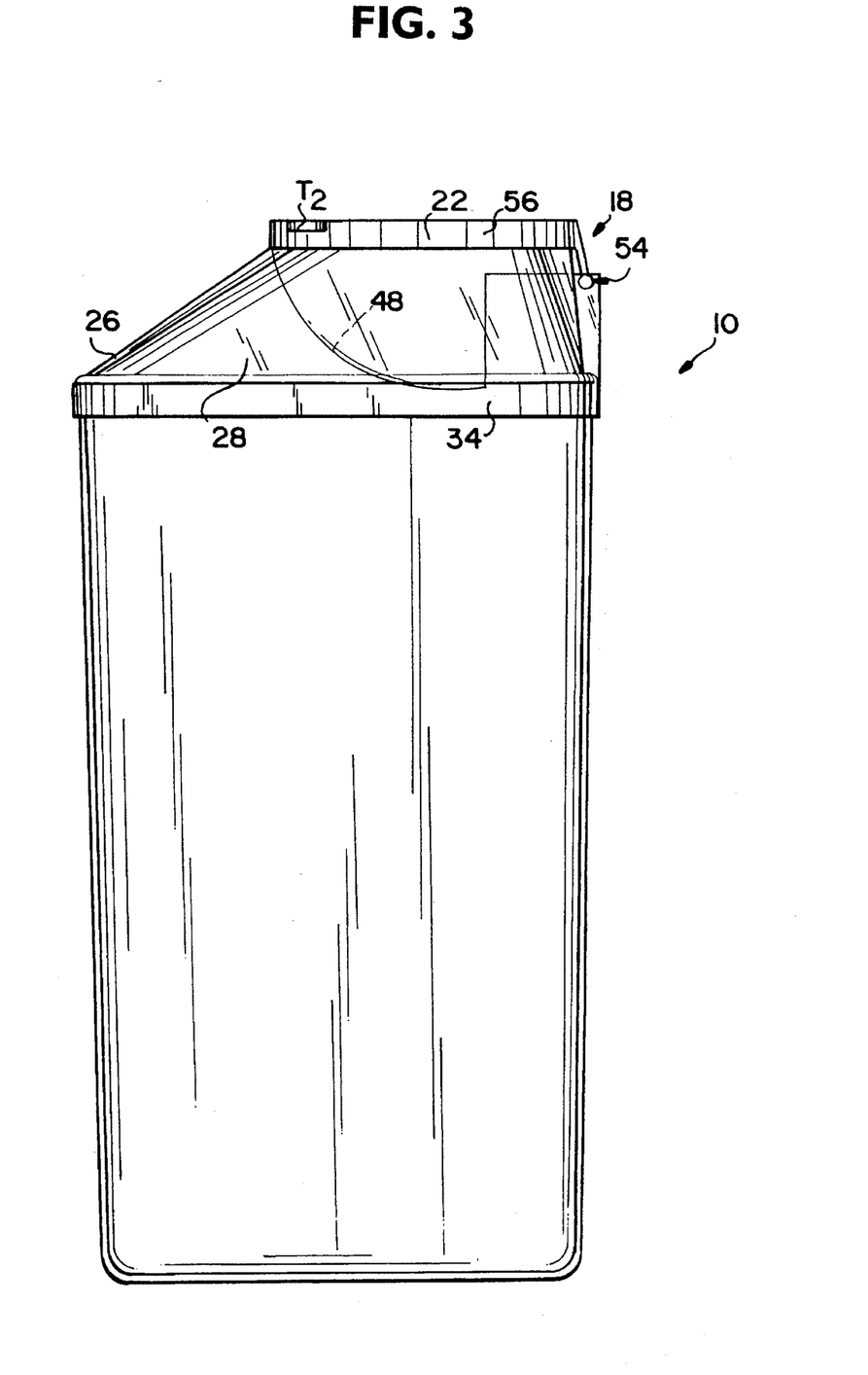
FIG. 3 is a right side elevation view of the dispensing cap and container according to the exemplary embodiment of the invention.
Figure 4:
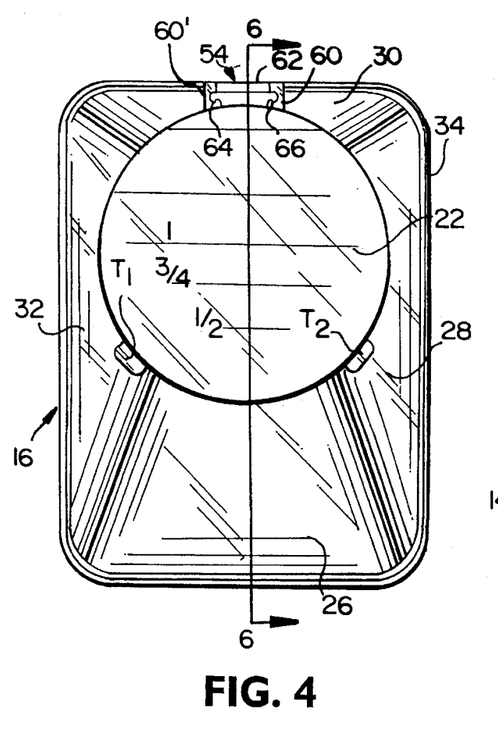
FIG. 4 is a top plan view of the dispensing cap and container in accordance with the exemplary embodiment of the invention.
Figure 5:
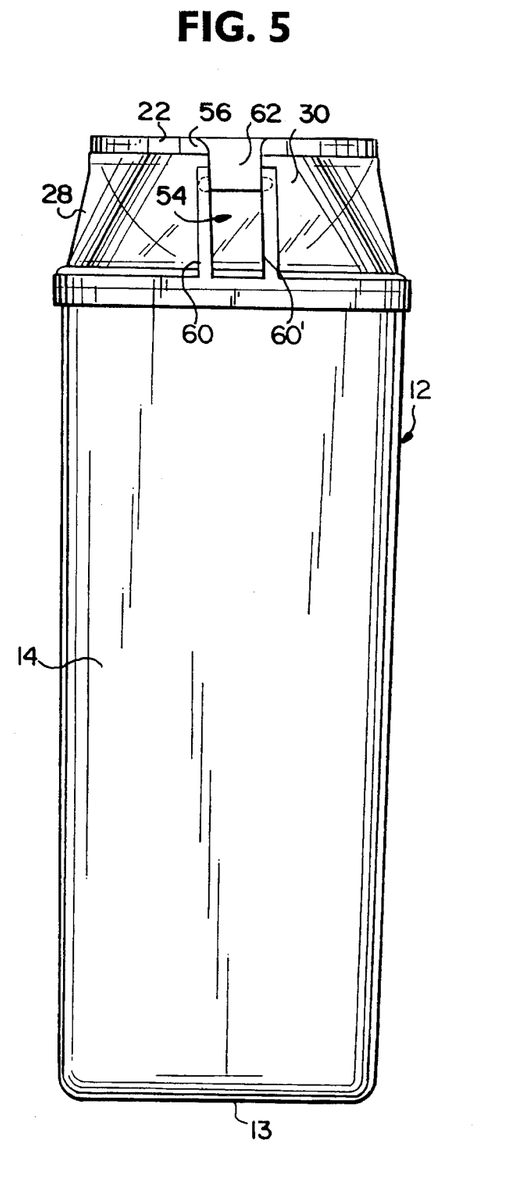
FIG. 5 is a rear elevation view of the dispensing cap and container in accordance with the exemplary embodiment of the invention.
Figure 6:
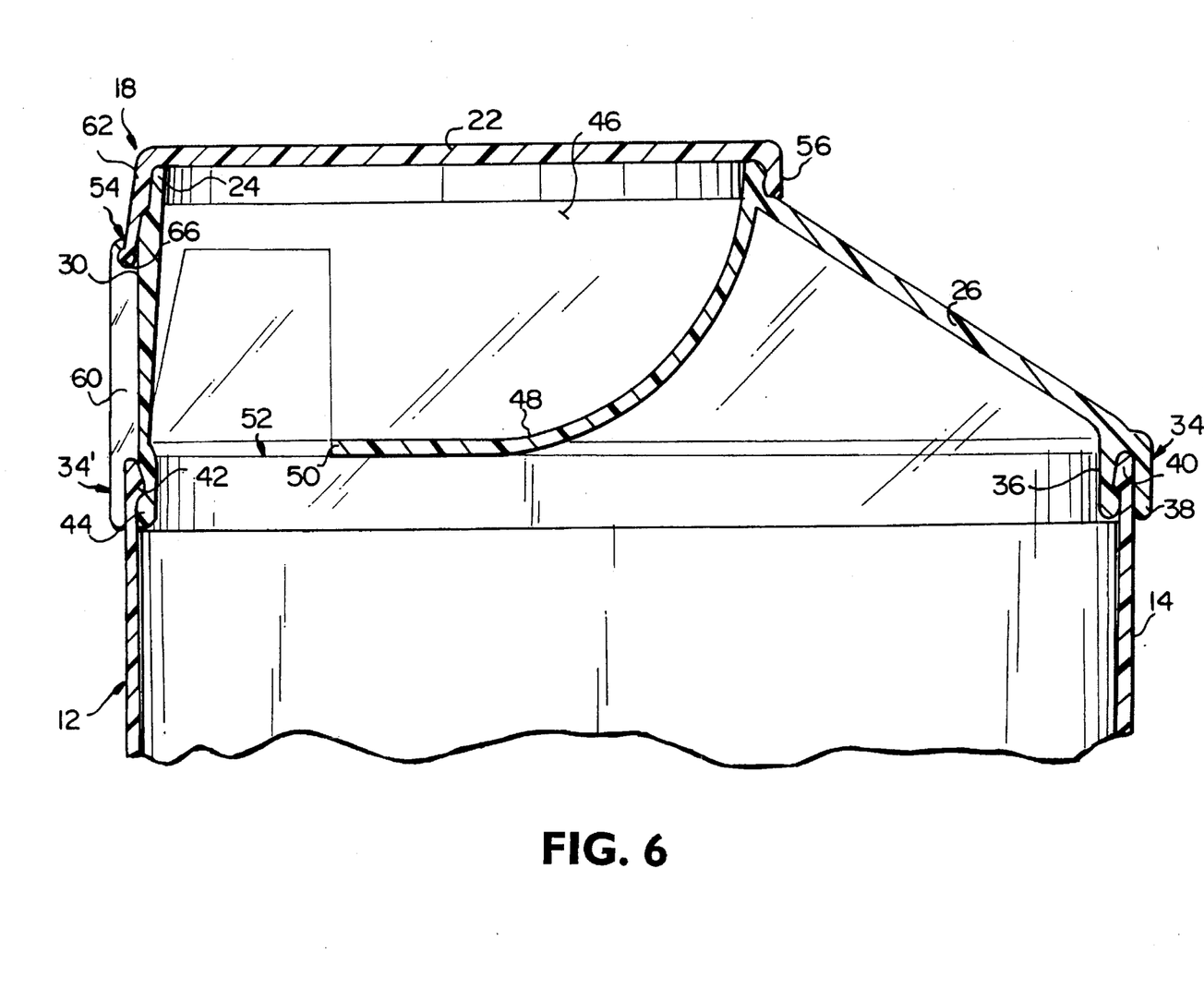
FIG. 6 is a cross sectional view taken across line 6—6 of FIG. 4.

As best seen in FIG. 6, the lower rectangular rim 34 of the depending skirt is comprised of an inner wall 36 and an outer wall 38 which define a downwardly opening rectangular groove adapted to cooperate with the upper open end 40 of the container 12 in the manner of a typical snap-fit closure. Specifically, the inside of the open upper end 40 of the container 12 is provided with an inwardly projecting rectangular bead 42 (continuous or intermittent) while inner wall 36 includes an outwardly projecting rectangular bead 44 (continuous or intermittent) over which the inwardly projecting bead 42 snaps to releasably hold the cap 18 on the container 12. Other fastening arrangements may be utilized as well.

The cap 16 is formed to provide a volumetric space or measuring chamber 46 from which measured amounts of contents can be dispensed as described in detail below. This volumetric space or measuring chamber 46 is defined by the upper rim 24, the lid or dispensing door 22 and an integral weir panel 48. The weir panel 48 is formed to provide an aperture 52 which is substantially chordal in shape when the panel is viewed in plan. More specifically, the weir panel 48 may be thought of as a semispherical panel sliced along one side of and parallel to a horizontal centerline to remove a portion of the panel and to thus form a weir edge 50 which intersects the base of the upper rim 24 at two locations such that the rim portion engaged by the panel 48 extends about 230° while the weir aperture 52 is defined by the weir edge 50 and the remaining approximate 130° of the circle described by the rim 24 (thus providing the aforementioned chordal shape of the weir aperture 52). Because the weir aperture 52 lies wholly to one side of the horizontal centerline through the cap and parallel to the edge 50, the weir panel effectively performs a dam function as described in greater detail below.

The dispensing door or lid 22 is pivotally secured via hinge mechanism 54 to the "rear" wall 30 of the skirt portion, below the upper rim 24. The hinge mechanism 54 will be described in greater detail below in connection with FIGS. 4, 5, 6 and 8. The dispensing door 22 has a peripheral depending flange 56 which is frictionally engageable with the upper circular rim 24 of the cap 16 in a conventional snap-fit manner. Two integral tabs $T_1$ and $T_2$ extend radially outward from the flange 56 and facilitate the opening of the dispensing door 22.

Figure 7:
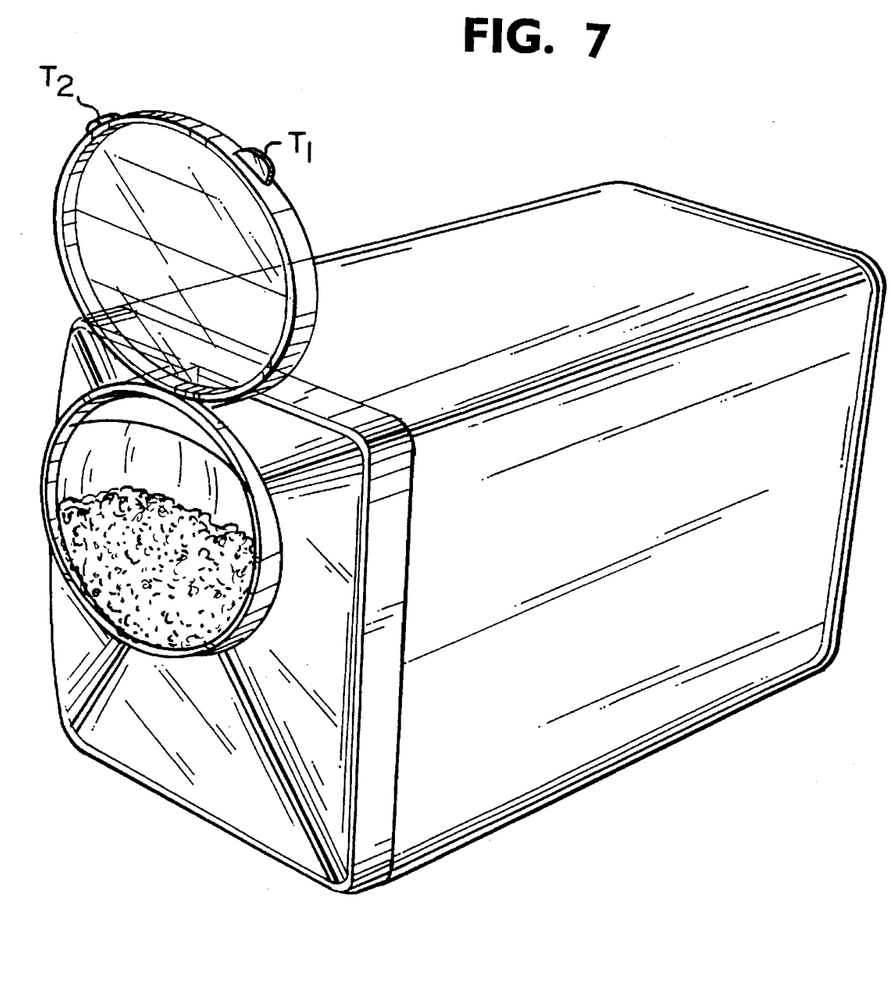
FIG. 7 is a perspective view of the dispensing cap and container showing the dispensing door in an open position and a measured amount of particulate, granular or powder-like material from the container resting in the measuring chamber of the cap.

The door hinge 54 is on the same side of the centerline parallel to the weir edge 50 as the weir aperture 52. This is also significant to the ability of the panel 48 to serve as a dam to prevent excess material from entering the measuring chamber 46 when contents are dispensed therefrom. In other words, with the cap 16 in place on the container 12, and with the door or lid 22 in the closed position, the user may tilt the container 12 in the manner shown generally in FIG. 7 so that contents will spill over the weir edge 50 through the weir aperture 52 and into the volumetric space or measuring chamber 46. The user may easily determine the volume of the spilled over contents with the assistance of level or volume indicators 58 (including lines and suitable alpha and/or numeric characters, e.g., 1 tsp., 1 tbs., etc.). When the desired amount of contents has been transferred to the chamber 46, the dispensing door 22 may be flipped open (as shown is FIG. 7) with the aid of one of the tabs $T_1$ or $T_2$, and the contents poured out of the measuring chamber 46 via dispensing aperture 20. In this regard, the semispherical design of the weir panel 48 also facilitates pouring the contents out of the cap by providing an inclined ramp-like surface leading to the dispensing aperture 20 when the container is in the horizontal position illustrated in FIG. 7. The design of the weir panel 48 and the eccentric location of the top relative to the cap also assists in this regard since, when in the orientation shown in FIG. 7, the weir edge 50 is substantially above a longitudinal centerline through the container. Thus, the panel 48 performs a dam function preventing additional contents from spilling into the chamber 46 as a measured amount is dispensed from aperture 20.

It will further be appreciated that the weir panel 48 may be formed with a smaller or larger aperture 52, so long as the weir edge 50 is retained to one side of the cap centerline.

As already discussed, the cap top 16 is defined by a flip open dispensing door or lid 22 secured via a hinge mechanism 54 to the "rear" wall 30 of the cap skirt portion. With reference now specifically to FIGS. 4, 5, 6 and 8, the hinge mechanism 54 is comprised of a pair of laterally spaced reinforcement ribs 60, 60' extending downwardly along the "rear" skirt wall 30 and preferably integral therewith. A second component of the hinge includes a tab 62 extending downwardly from lid flange 56 in alignment above and between the reinforcing ribs 60, 60'. Tab 62 is formed with two lateral extending projections 64, 66 of generally spherical shape.

Figure 8:
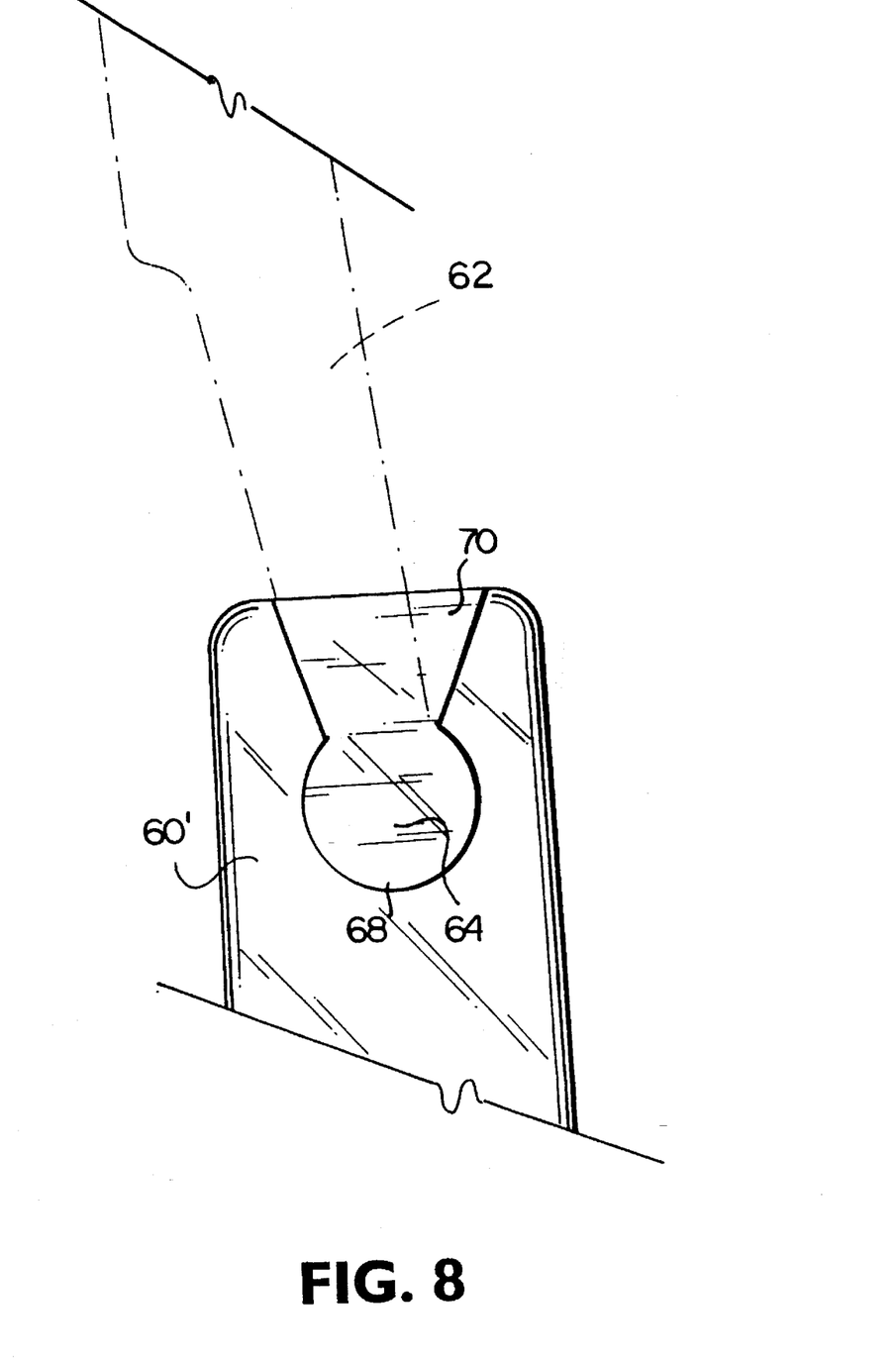
FIG. 8 is a partial side elevation view of the inside wall of the hinge mechanism with the cap shown partially in phantom.

With specific reference to FIG. 8, it may be seen that the inside of reinforcement rib 60' (as well as rib 60) is formed with a generally spherical recess 68 and tapered entry groove 70, and the inside of reinforcement rib 60 is similarly formed. As may be appreciated from FIG. 8, the lateral projections 64, 66 may be snap fit into the spherical recesses 68 in opposed inside surfaces of ribs 60 and 60' with the aid of tapered entry grooves 70 thereby forming a horizontal pivot axis extending between the lateral projections 64, 66. At the same time, the tapered entry grooves 70 define limits of pivotal movement of the lid or door 22 between open and closed positions.

It will be appreciated that the above described cap construction provides a cost effective design which is easy to use and easy to manufacture, and which enables dispensing of precisely measured amounts from a container, thereby eliminating the need for separate measuring devices such as cups and spoons.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A container and measuring/dispensing cap assembly comprising:

a container having a peripheral wall including four side wall portions, a bottom wall and an open upper end;

a cap including a top portion having a dispensing aperture defined by an upper rim and a pivotally mounted dispensing door engageable with said rim and a peripheral skirt portion tapering downwardly and outwardly from said top portion to a lower attachment rim adapted to secure the cap to the container, said dispensing aperture and said dispensing door located asymmetrically relative to the open upper end of the container; a weir panel located below said top portion of said cap and partially defining a measuring chamber in said cap, and wherein said weir panel includes a weir edge which, in combination with said upper rim, defines a weir aperture located wholly on one side of a center axis of said cap extending parallel to said weir edge; and further wherein said dispensing door is pivotally secured to said skirt portion by a hinge located adjacent said weir aperture.

2. The assembly of claim 1 wherein said open upper end is rectangular in shape and said dispensing aperture is round in shape.

3. The assembly of claim 1 wherein said weir panel is generally semispherical in shape and said weir aperture is chord shaped when viewed in plan.

4. The assembly of claim 3 wherein said weir panel extends approximately 230° about said upper rim.

5. The assembly of claim 1 wherein at least said dispensing door is constructed of substantially transparent material.

6. The assembly of claim 5 wherein said dispensing door is provided with volumetric indicia thereon.

7. The assembly of claim 1 wherein at least said dispensing door and said container are constructed of substantially transparent material.

8. The assembly of claim 1 wherein said dispensing door includes a downwardly extending tab provided with a pair of oppositely directed projections and wherein said oppositely directed projections are pivotally secured within complementary recesses formed in said skirt portion.

9. The assembly of claim 8 wherein said complementary recesses are formed in respective laterally spaced reinforcing ribs extending downwardly along said skirt portion.

10. The assembly of claim 9 wherein said complementary recesses each include a tapered entry groove to facilitate mounting of said dispensing door.

11. The assembly of claim 1 wherein said upper rim is provided with an outwardly projecting bead and said dispensing door is provided with a depending flange having an inwardly projecting bead, said outwardly projecting bead and said inwardly projecting bead adapted to cooperate to secure said dispensing door in a closed position.

12. The assembly of claim 1 wherein said lower rim is comprised of inner and outer walls adapted to engage therebetween the open upper end of the container.

13. The assembly of claim 12 wherein said inner wall of said lower rim is provided with a projecting bead adapted to cooperate with an oppositely projecting bead on the open upper end of the container to removably secure the cap to the container.

14. The assembly of claim 1 wherein said weir panel is integral with said cap.

15. The assembly of claim 1 wherein said container is substantially rectangular in shape, and said dispensing aperture and said dispensing door are substantially round in shape.

* * * * *